Oct. 7, 1969     F. HERCZEG     3,471,184

ARBOR FOR MACHINE TOOL

Filed Oct. 24, 1968

INVENTOR
FRANK HERCZEG
BY Hobbs & Green

ATTORNEYS

United States Patent Office 3,471,184
Patented Oct. 7, 1969

3,471,184
ARBOR FOR MACHINE TOOL
Frank Herczeg, 121 N. Oakley Ave.,
Mishawaka, Ind. 46544
Filed Oct. 24, 1968, Ser. No. 770,151
Int. Cl. F16d 1/06; B27b 5/18; B24b 41/04
U.S. Cl. 287—53                                          8 Claims

ABSTRACT OF THE DISCLOSURE

An arbor for machine tools and the like having a shank and an annular shaped head with two oppositely disposed holes extending therethrough and opening adjacent the periphery of said shank. A member having a tool receiving area with a radial flange on one side and two arms on the other side is secured to the head by a nut threaded onto said arms extending through the holes in said head. When mounted on the arbor, the tool is disposed on said area between the flange and the head.

---

The conventional or standard machine tool arbor consists of a shank which is clamped in a fixture on the machine spindle, and a tool centering member is secured to the free end of the shank by a screw extending into a threaded hole in the center of the shaft, clamping the tool in operating position. In the conventional arrangement, the tool is difficult to mount and secure in place on the shaft, and the arbor frequently requires removal of the shank from the machine fixture in order to assemble the tool satisfactorily on the arbor. It is therefore one of the principal objects of the present invention to provide a rotary tool arbor which is so constructed and designed that the tool can be mounted in operating position on the arbor and secured in place from the free end thereof while the arbor is clamped in the machine spindle, and which has only a relatively thin member for the securing means at the free end of the arbor.

Another object of the invention is to provide an arbor for a rotary machine tool which permits the tool to be effectively secured in place by tightening a single nut on the spindle side of the tool, and which permits the tool to be assembled on and removed from the arbor by merely loosening the nut from the tool securing means without removing the arbor from the machine.

Still another object of the invention is to provide an arbor of the aforementioned type which is simple to assemble and disassemble from the free end of the arbor and to secure the tool in place, and which is compact, sturdy and readily adaptable to various machines and different types of tools.

Additional objects and advantages of the invention will become apparent from the following description and accompanying drawing, wherein.

Figure 3:
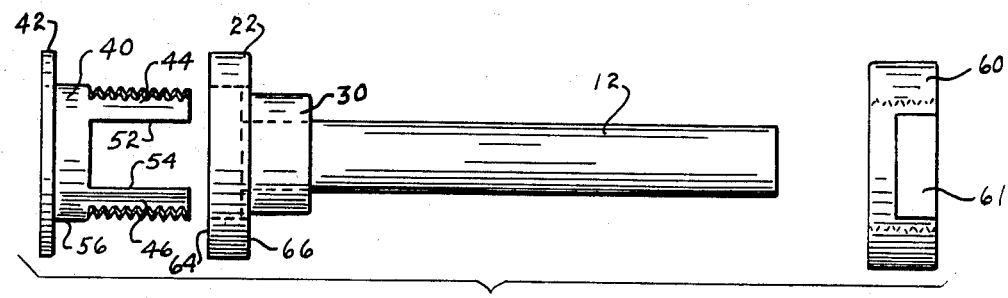
FIGURE 3 is an exploded side elevational view of the parts of the arbor shown in FIGURES 1 and 2.

Referring more specifically to the drawings, numeral 10 designates generally the present machine tool arbor having a shank 12 for mounting the arbor in a fixture or other securing means for a rotating spindle of a machine. The shank 12 may be secured in the fixture by any suitable means, including one or more set screws or a collet. The shank would normally be cylindrical in shape and may have one or more flat lands therealong for the purpose of firmly seating a set screw or screws. Other types and shapes of shanks may be used to satisfy the requirements of the machine structure in mounting the arbor on the machine. The arbor may be used within any one of a number of different tools, the tool shown being a disc-shaped cutting blade 14 with teeth disposed around the periphery thereof. The blade is generally flat and is provided with a central hole for receiving the arbor.

A head 20 is mounted on and formed integrally with the free end of the shank and has an annular portion 22 containing a recess 24 and two laterally disposed openings 26 and 28 along the inner side of annular portion 22. A boss 30 is mounted on the shank and formed integrally with the shank and head and is provided with two laterally spaced grooves 32 and 34 corresponding to openings 26 and 28, respectively. The bottom of the two grooves is substantially on a plane with the cylindrical surface of shank 12, and the two grooves terminate at wall 36.

A tool securing member is removably mounted on the head and consists of a cylindrical body 40 having an annular flange 42 on the external side thereof and two laterally extending arms 44 and 46 oppositely disposed on the body. The two arms are of substantially the same size and shape as openings 26 and 28 and are provided on the external surface with screw threads 48 and 50. The external periphery of the two arms has the same curvature as disc-shaped body 40, and the inner sides 52 and 54 of the two arms are substantially flat and straight and parallel with one another and with the axis of the cylindrical portion of shank 12. The periphery 56 of body 40 is adapted to slip through the center opening of tool 14 and to support the tool when it is mounted on the arbor.

When the arbor is assembled, the two arms 44 and 46 extend through openings 26 and 28, and into, and normally through, grooves 32 and 34. The members are assembled in this position after the tool 14 has been mounted on member 40 and seated against annular flange 42. When member 40 has been assembled on the shank with the tool thereon and arms 44 and 46 inserted through openings 26 and 28 and grooves 32 and 34, a nut 60 is mounted on the shank and is screwed onto the threaded portions 48 and 50 of arms 44 and 46, using a wrench placed on flattened portions 61 and 62. The nut draws the two arms longitudinally inwardly through holes 26 and 28 and along grooves 32 and 34 until flange 42 seats firmly against the adjacent side of tool 14 and the tool seats firmly against adjacent side 64 of head 20. As nut 60 is fully tightened, the tool is gripped firmly between head 20 and flange 42, thus retaining the tool in proper operating condition on the arbor. The parts of the arbor are all constructed of suitable steel, and when the parts are assembled in the positions illustrated in FIGURE 5, the arbor becomes in effect a unitary member which will retain the tool in proper operating position without any further adjustment.

In the use of the present arbor, the cylindrical portion of shank 12 may be assembled in the fixture of the spindle of a machine and secured rigidly in place. The nut 60 is disengaged from the threads of arms 44 and 46, thus permitting complete removal of member 40 from the shank head. The tool is then assembled on member 40 and seated on the periphery 56 thereof and against the inner surface of flange 42. With the tool in this position, the arms 44 and 46 of member 40 are inserted through openings 26 and 28 and through grooves 32 and 34 until the tool is seated against side surface 64 of annular portion 22 of head 20. With member 40 seated in this position, nut 60 is screwed onto threaded portions 48 and 50 and tightened against side surface 66, thus drawing the two arms and body 40 and flange 42 to the right, thereby seating flange 42 firmly against the side of tool 14. This seats the tool against side surface 64, and clamps the tool rigidly in the arbor.

Figure 4:
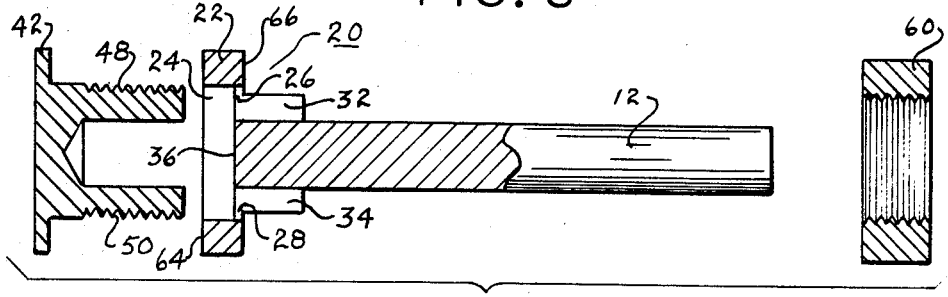
FIGURE 4 is an exploded partial cross sectional and elevational view of the arbor shown in the preceding figures, the section being taken on line 4—4 of FIGURE 1.
Figure 5:
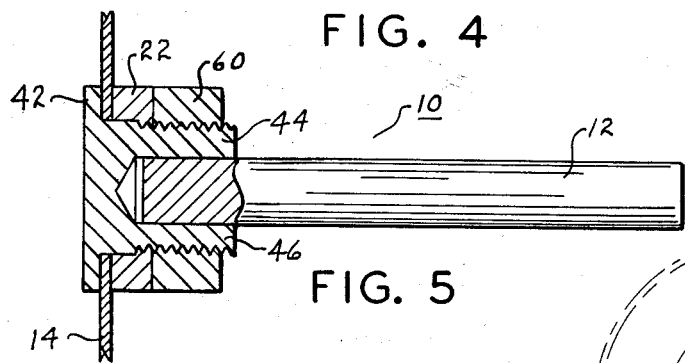
FIGURE 5 is a partial cross sectional and elevational view of the arbor in its assembled position, showing a tool held therein, the section being taken on line 5—5 of FIGURE 1.
Figure 6:
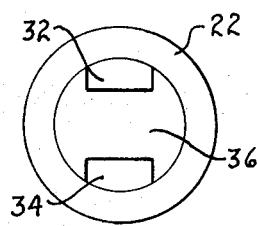
FIGURE 6 is an elevational view of one of the parts shown in the preceding figures.
Figures 1, 2:
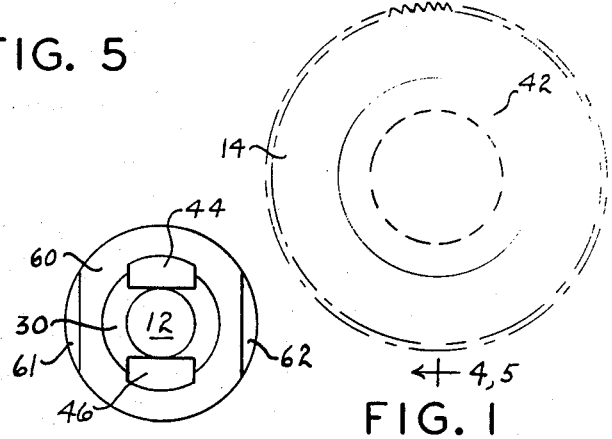
FIGURE 1 is an end elevational view of an arbor for a machine tool, embodying the present invention.
FIGURE 2 is a view of the end of the arbor opposite that shown in FIGURE 1.

In the event another tool is to be substituted for the tool already in the arbor, only nut 60 needs to be loosened and removed from arms 44 and 46, thereby permitting member 40 to be slipped to the left as viewed in FIGURES 3, 4, and 5 and removed from head 20. The tool is then removed from member 40 and a new tool with a similar center hole is mounted on member 40 and the member reassembled and tightened in place by nut 60, in the manner described hereinabove.

The present arbor may be made in various sizes to accommodate different size tools and center holes of the tool, and may be modified in various respects to satisfy the requirements for the machine and the tool on which the machine is used. While only one embodiment of the present arbor has been described in detail herein, various changes and modifications, in addition to those mentioned above, may be made without departing from the scope of the invention.

I claim:

1. An arbor for machine tools, comprising a shank, an enlarged head mounted on one end of said shank and having a pair of holes therethrough opening generally at the side of said shank, a member having a tool receiving area and a radially extending flange on one side of said area and two arms on the other side of said area extending through the openings in said head, screw threaded portions on the external surface of said arms, and a nut on the side of said enlarged head facing away from said radial flange and engaging said screw threaded portions for holding said flange firmly against a tool mounted on said area.

2. An arbor for machine tools as defined in claim 1 in which said enlarged head is generally cylindrical in shape and contains a generally disc-shaped wall, and a member connects said enlarged head to said shank.

3. An arbor for machine tools as defined in claim 2 in which said connecting member includes a pair of axially disposed grooves communicating with the pair of holes through said enlarged head.

4. An arbor for machine tools as defined in claim 1 in which said holes in said enlarged head are diametrically opposite one another.

5. An arbor for machine tools as defined in claim 3 in which said holes and grooves are diametrically opposite one another.

6. An arbor for machine tools as defined in claim 1 in which said tool receiving area is generally annular in shape.

7. An arbor for machine tools as defined in claim 5 in which said tool receiving area is generally annular in shape.

8. An arbor for machine tools as defined in claim 1 in which said enlarged head has a cylindrical recess in the end thereof and said member having the tool receiving area contains an extension of said area for seating in said recess.

References Cited
UNITED STATES PATENTS

| | | | |
|---|---|---|---|
| 1,329,857 | 2/1920 | Rosner | 51—168 |
| 1,409,758 | 3/1922 | Nichols | 287—52.07 |
| 2,890,071 | 6/1959 | Johnson | 287—52.06 |

CARL W. TOMLIN, Primary Examiner

A. V. KUNDRAT, Assistant Examiner

U.S. Cl. X.R.

51—168; 143—155